US011773317B2

(12) United States Patent
Kersey

(10) Patent No.: US 11,773,317 B2
(45) Date of Patent: Oct. 3, 2023

(54) SMART PROPPANT TECHNOLOGY FOR FRACKING AND WELL PRODUCTION PERFORMANCE MONITORING

(71) Applicant: CiDRA Corporate Services Inc., Wallingford, CT (US)

(72) Inventor: Alan D. Kersey, South Glastonbury, CT (US)

(73) Assignee: CiDRA CORPORATE SERVICES INC., Wallingford, CT (US)

(*) Notice: Subject to any disclaimer, the term of this patent is extended or adjusted under 35 U.S.C. 154(b) by 11 days.

(21) Appl. No.: 17/532,044

(22) Filed: Nov. 22, 2021

(65) Prior Publication Data

US 2022/0145168 A1    May 12, 2022

Related U.S. Application Data

(63) Continuation of application No. 14/759,795, filed as application No. PCT/US2014/010662 on Jan. 8, 2014, now abandoned.

(60) Provisional application No. 61/750,101, filed on Jan. 8, 2013.

(51) Int. Cl.
| | |
|---|---|
| *C09K 8/80* | (2006.01) |
| *E21B 43/26* | (2006.01) |
| *E21B 43/14* | (2006.01) |
| *E21B 49/08* | (2006.01) |
| *E21B 43/267* | (2006.01) |
| *E21B 47/11* | (2012.01) |

(52) U.S. Cl.
CPC .............. *C09K 8/805* (2013.01); *E21B 43/14* (2013.01); *E21B 43/26* (2013.01); *E21B 43/267* (2013.01); *E21B 47/11* (2020.05); *E21B 49/08* (2013.01)

(58) Field of Classification Search
CPC ......... C09K 8/805; E21B 47/11; E21B 43/14; E21B 43/26; E21B 43/267; E21B 47/00; E21B 49/08
See application file for complete search history.

(56) References Cited

U.S. PATENT DOCUMENTS

| | | | |
|---|---|---|---|
| 4,779,453 | A | 10/1988 | Hopenfeld |
| 5,187,542 | A | 2/1993 | Madzsar |
| 5,551,484 | A | 9/1996 | Charboneau |

(Continued)

FOREIGN PATENT DOCUMENTS

| | | |
|---|---|---|
| WO | 2012162609 | 11/2012 |
| WO | 2012177144 | 12/2012 |
| WO | 2013158308 | 10/2013 |

*Primary Examiner* — Crystal J. Lee
(74) *Attorney, Agent, or Firm* — Ware, Fressola, Maguire & Barber LLP

(57) ABSTRACT

The present invention provides a proppant or proppant mixture having insert materials configured for providing a mechanical or physical function in a well to hold open fissures or pathways created in formations caused by well fracking to allow a release of a hydrocarbon from the well, the insert materials being configured at least partly with beads having a functionalized polymer so as to form functionalized polymer proppants that are configured to respond to the hydrocarbon or other composition of matter released from the well, including water, and provide at least one chemical taggant containing an indication about the hydrocarbon or other composition of matter released from the well. The functionalized polymer may include a dual-monomer structure.

12 Claims, 2 Drawing Sheets

Example of Release of Chemical Taggant

(56) References Cited

U.S. PATENT DOCUMENTS

| | | |
|---|---|---|
| 6,644,917 B2 | 11/2003 | Zhao et al. |
| 6,645,769 B2 * | 11/2003 | Tayebi ............... G01N 33/2882 |
| | | 436/27 |
| 8,215,164 B1 | 7/2012 | Hussain et al. |
| 8,273,320 B2 | 9/2012 | DiTommaso et al. |
| 8,568,573 B2 | 10/2013 | Winkie et al. |
| 2001/0036667 A1 | 11/2001 | Tayebi et al. |
| 2004/0074644 A1 | 4/2004 | Kotlar et al. |
| 2008/0133193 A1 | 6/2008 | Gdanski et al. |
| 2009/0087912 A1 * | 4/2009 | Ramos .................... E21B 47/11 |
| | | 436/27 |
| 2009/0162632 A1 | 6/2009 | Kirby et al. |
| 2009/0288820 A1 | 11/2009 | Barron |
| 2010/0132944 A1 | 6/2010 | Li et al. |
| 2010/0307745 A1 * | 12/2010 | Lafitte .................... E21B 47/11 |
| | | 166/250.12 |
| 2012/0099954 A1 * | 4/2012 | Teichrob ................ B65G 67/36 |
| | | 414/332 |
| 2013/0017610 A1 | 1/2013 | Roberts |
| 2013/0056204 A1 | 3/2013 | Mcdaniel |
| 2013/0091941 A1 | 4/2013 | Huh |
| 2013/0268198 A1 * | 10/2013 | Nyhavn .................. E21B 27/02 |
| | | 702/6 |
| 2014/0309149 A1 | 10/2014 | Mcdaniel |
| 2015/0268370 A1 | 9/2015 | Johnston |
| 2016/0002523 A1 | 1/2016 | Huh |
| 2017/0283686 A1 | 10/2017 | Mcdaniel |

* cited by examiner

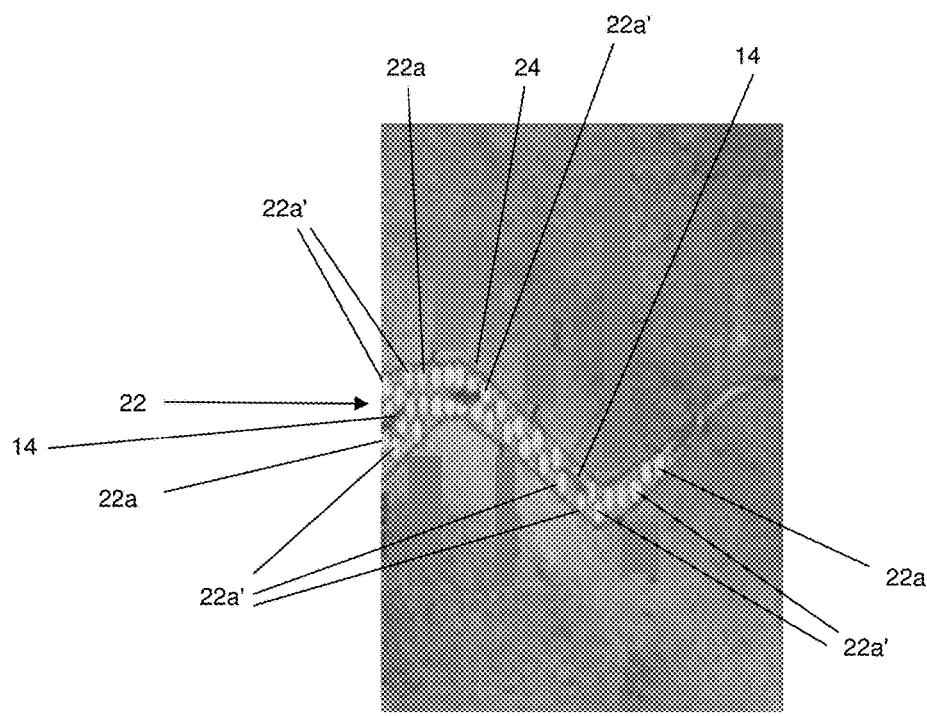
Figure 1c: Example of a Fissure 24
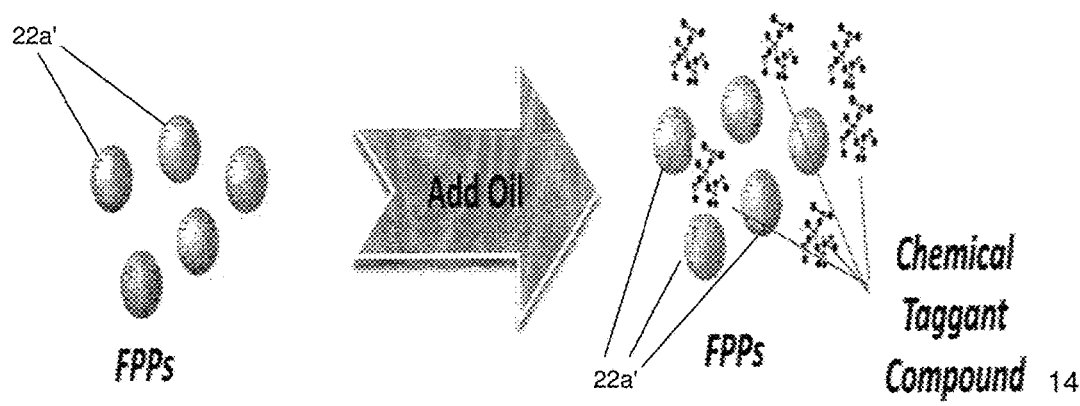
Figure 2: Example of Release of Chemical Taggant
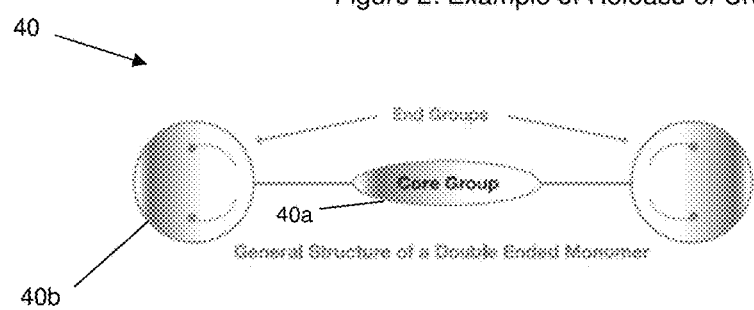
Figure 3: Example of Dual-Monomer Structure

SMART PROPPANT TECHNOLOGY FOR FRACKING AND WELL PRODUCTION PERFORMANCE MONITORING

CROSS-REFERENCE TO RELATED APPLICATIONS

This application is a continuation of, and claims benefit to, application Ser. No. 14/759,795, filed 8 Jul. 2015, which corresponds international patent application serial no. PCT/US2014/010662, filed 8 Jan. 2014, which itself claims benefit to provisional patent application Ser. No. 61/750,101 (712-2.397//CCS-0113), filed 8 Jan. 2013, which is incorporated by reference in their entirety.

This application is also related to provisional patent application Ser. No. 61/750,632 (712-2.398//CCS-0114), filed 9 Jan. 2013, and provisional patent application Ser. No. 61/873,958 (712-2.411//CCS-0125), filed 9 Sep. 2013, which are both hereby incorporated by reference in their entirety.

BACKGROUND OF THE INVENTION

1. Field of Invention

The present invention relates to techniques for fracking and well production performance monitoring; and more particularly relates to a proppant or proppants for using in such techniques for fracking and well production performance monitoring.

2. Description of Related Art

High pressure fracturing ("fracking") of wells is a well known technology used to stimulate a formation to produce hydrocarbons.

Fracking creates fissures in formations that are otherwise relatively impermeable to the flow of oil or gas, and the fracking creates micro-fissures along which trapped hydrocarbons can migrate towards a producing well bore.

Typically, a proppant or proppants are known in the art and include inert materials configured for providing a mechanical/physical function in the well. (The terms "proppant" and "proppants" appear to be used interchangeably in the prior art literature, and are thus understood to be used interchangeably herein.) In effect, known proppants have insert materials that are used to assist and/or aid the effectiveness of fracking. The insert materials can be sand or ceramic materials, as well as small non-functionalized polymer beads. For example, known proppants are used in well fracking to permanently hold open fissures in formations to allow the release of hydrocarbons. It may be added to a fracking fluid which may vary in composition depending on the type of fracturing used, and can be gel, foam or slickwater-based.

Fracking is normally completed in 'zone', i. e., sections of the well that are pressure-isolated from each other are separately pressure fracked.

Once fracked, a well will produce more effectively; however, it may be difficult to understand how efficient the fracking of a given zone has been, and the production efficiency (yield) of each zone.

In view of the aforementioned understanding, there is a need in the industry for a better way to monitor fracking and well production performance.

SUMMARY OF THE INVENTION

The present invention provides a new and unique approach for using a proppant mixture having proppants manufactured using a functionalized polymer.

These so-called Functionalized Polymer Proppants (FPPs) are designed to perform the mechanical functions as with, or similar to, the known or conventional proppant, but also to release a chemical taggant, e.g., when in contact with a hydrocarbon.

Furthermore, the new proppant mixture can be designed to release a range of different tracer chemical compounds, providing an ability to uniquely identify a given proppant in a system.

In this way, for example, a well can be 'fingerprinted' or encoded by zone(s). Strong hydrocarbon production at one zone with weak production at all other zones may be identifiable by detecting the presence of the tracer compound associated with the proppant used, e.g., in zone 1 over those associated with the other zones.

This could also be extended to allow the new functionalized polymer proppant(s) to release a different tracer chemical compound in the presence of water being produced from the formation, e.g., thus allowing the detrimental water producing zones to be identified.

Examples of Particular Embodiments

Examples of particular embodiments of the present invention may include the following:

According to some embodiments, the present invention provides an article of manufacture that may include, or take the form of, a new proppant or proppant mixture featuring insert materials configured as for providing a mechanical or physical function in a well to hold open fissures or pathways created in formations caused by well fracking to allow a release of a hydrocarbon from the well, the insert materials being configured at least partly with beads having a functionalized polymer so as to form functionalized polymer proppants that are configured to respond to the hydrocarbon or other composition of matter released from the well, including water, and provide at least one chemical taggant containing an indication or information about the hydrocarbon or the other composition of matter released from the well. In effect, the functionalized polymer proppants release the at least one chemical taggant when in contact with the hydrocarbon or the other composition of matter released from the well. By way of example, the indication about the hydrocarbon or the other composition of matter released from the well may include the presence or absence of the hydrocarbon or the other composition of matter, as well as the type or kind of the hydrocarbon or the other composition of matter, the location of the zone of the hydrocarbon or the other composition of matter, etc. The scope of the invention is not intended to be limited to the type or kind of indication related to the release of the at least one chemical taggant.

The present invention may also include one or more of the following features:

The functionalized polymer proppants may be configured to release a range of different tracer chemical compounds or chemical taggants so as to provide an ability to uniquely identify a given proppant in the well so as to allow the well to be fingerprinted or encoded by zone(s).

The range of different tracer chemical compounds or taggants may be configured to release a different chemical compound or taggant in the presence of water being produced from the formations so as to allow detrimental water producing zones to be identified in the well.

The functionalized polymer may include a polymer structure, e.g., including a dual-monomer structure as well as other "normal" polymer structures characterized by a chemical compound or mixture of compounds formed by polymerization and consisting essentially of repeating structural units.

The dual-monomer structure may be configured to allow a tracer to be incorporated as a payload or core group.

The tracer may be configured to be released via a desired external influence, including when coming in contact with water, or the other composition of matter having a predetermined pH, or a predetermined hydrocarbon, including oil or natural gas.

The dual-monomer structure may include a core group and end groups.

The beads may be configured as solid materials, e.g., either made from sand or ceramic materials coated with the functionalized polymer, or made from the functionalized polymer.

The proppants may formed as part of a fracking fluid, including fracking fluids that are gel-based, foam-based or slickwater-based.

According to some embodiments, the present invention may include, or take the form of, apparatus featuring a well configured with fissures or pathways created in formations caused by well fracking to allow a release of a hydrocarbon from the well; and a proppant or proppant mixture having insert materials configured for providing a mechanical or physical function in the well to hold open the fissures or pathways, where the insert materials are configured at least partly with beads having a functionalized polymer so as to form functionalized polymer proppants that are configured to respond to the hydrocarbon or other composition of matter released from the well, including water, and provide at least one chemical taggant containing an indication about the hydrocarbon or the other composition of matter released from the well.

The apparatus may also include one or more of the features set forth herein, according to some embodiments of the present invention. In addition, the apparatus may also include a fracking fluid comprising the proppant, including where the fracking fluid is gel-based, or foam-based, or slickwater-based. At least one released chemical taggant may be carried to the surface of the well in hydrocarbon fluids, including well production fluids. The apparatus may also include sampling equipment configured to sample the hydrocarbon fluids, detect the at least one released chemical taggant, and determine a measure of an efficiency of a given zone in the well, based at least partly on at least one released and detected chemical taggant.

According to some embodiments, the present invention may include, or take the form of, a fracking fluid, featuring a proppant or proppant mixture having insert materials configured for providing a mechanical or physical function in a well to hold open fissures or pathways created in formations caused by well fracking to allow a release of a hydrocarbon from the well, where the insert materials are configured at least partly with beads having a functionalized polymer so as to form functionalized polymer proppants that are configured to respond to the hydrocarbon or other composition of matter released from the well, including water, and provide at least one chemical taggant containing an indication about the hydrocarbon or the other composition of matter released from the well.

The fracking fluid may also include one or more of the features set forth herein, according to some embodiments of the present invention.

The Method

According to some embodiments, the present invention may include, or take the form of, a method or process that includes steps for using a proppant or proppant mixture having insert materials configured for providing a mechanical or physical function in a well to hold open fissures or pathways created in formations caused by well fracking to allow a release of a hydrocarbon from the well, and configuring the insert materials at least partly with beads having a functionalized polymer so as to form functionalized polymer proppants that are configured to respond to the hydrocarbon or other composition of matter released from the well, including water, and provide at least one chemical taggant containing an indication about the hydrocarbon or the other composition of matter released from the well.

The method may also include one or more of the features set forth herein, according to some embodiments of the present invention.

A Functionalized Polymer Layer or Liner

According to some embodiments, the present invention may take the form of a functionalized polymer layer or liner for applying to a conduit having a process fluid flowing therein, featuring a layering material configured at least partly with beads having a functionalized polymer so as to form a functionalized polymer layer or liner that is configured to respond to a part of the process fluid, and provide at least one chemical taggant containing an indication about the part of the process fluid. The conduit may take the form of a borehole of a well or a process pipe having the process fluid flowing therein. The functionalized polymer layer or liner may also include one or more of the features set forth herein.

Advantages

By way of example, some advantages of the present invention may include the following:

If functionalized polymer proppants are added to each zone in a so-called "Fracking Job", then the hydrocarbon production performance of each zone could be determined by detecting the ratio of the various unique taggants present in a sample of the overall well production fluid.

This could also be used to assess whether the fracking job was effective, and whether any zones require re-fracking to increase production efficiencies.

If water is produced by a given zone, then the approach could allow an operator to decide not to re-frack a particular zone during the next re-frack cycle, thus improving the well's overall efficiency in reducing water production.

BRIEF DESCRIPTION OF THE DRAWING

The drawing includes FIGS. 1-3, which are not necessarily drawn to scale, as follows:

FIG. 1, includes FIGS. 1a, 1b and 1c, where FIG. 1c shows an example of a fissure having at least some functionalized polymer proppants according to some embodiments of the present invention.

FIG. 2 shows functionalized polymer proppants coming in contact with oil and releasing at least one chemical taggant compound, according to some embodiments of the present invention.

FIG. 3 shows an example of a functionalized polymer proppant configured from, or in the form of, a dual-monomer structure with a core group and end groups, according to some embodiments of the present invention.

DETAILED DESCRIPTION OF BEST MODE OF THE INVENTION

FIG. 1a

Figure 1A:
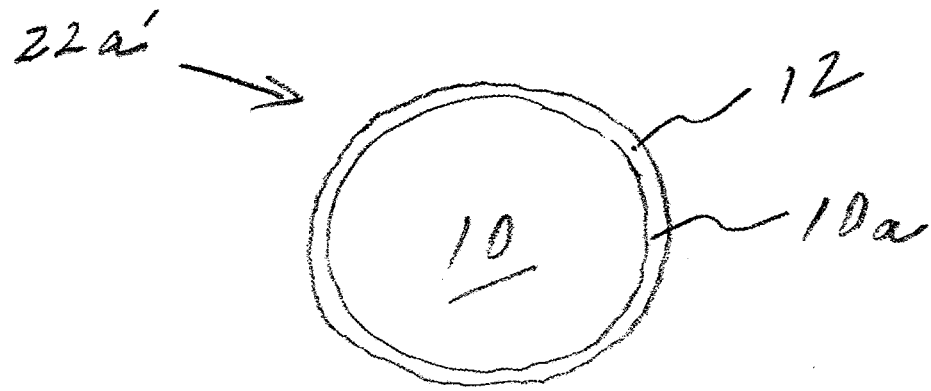
FIG. 1a shows an example of a functionalized polymer proppant having a bead with a functionalized polymer; where

FIG. 1a shows a bead 10 having a functionalized polymer 12 so as to form a functionalized polymer proppant that is configured to respond to a hydrocarbon or other composition of matter, e.g., released from a well 20 (see FIG. 1b), including water, and provide at least one chemical taggant 14 (see FIG. 2) containing an indication about the hydrocarbon or the other composition of matter released from the well. According to some embodiments of the present invention, the functionalized polymer bead 10 in FIG. 1a may form part of a proppant or proppant mixture 22 having insert materials 22a (also known as non-functionalized proppants) configured for providing a mechanical or physical function in the well 20 (FIG. 1b) to hold open fissures or pathways 24 created in formations caused by well fracking to allow a release of the hydrocarbon from the well. According to some embodiments of the present invention, the insert materials 22a may be configured at least partly with beads like element 10 having the functionalized polymer 12 like that shown in FIG. 1a, so as to form functionalized polymer proppants indicated by reference numeral 22a'. In operation, the functionalized polymer proppants like element 22a' are configured to respond to the hydrocarbon or other composition of matter released from the well 20, including water, and provide at least one chemical taggant containing an indication about the hydrocarbon or the other composition of matter released from the well 20, e. g., consistent with that shown in FIG. 2.

By way of example, the beads like element 10 may be configured as solid materials, e.g., either made from sand or ceramic materials coated with the functionalized polymer, or made or manufactured substantially from the functionalized polymer. The bead 10 may take the form of different geometric shapes, including at least partially spherical, partially tubular, etc.; and the scope of the invention is not intended to be limited to any particular type or kind of geometrical shape or dimension. By way of example, the bead 10 may be hollow throughout, like a hollow tube; may be partially hollowed out, e.g., with an indent or recess; or may be solid in form, like a solid sphere or solid tubular structure or rod. By way of example, the reader is referred to PCT application no. PCT/US12/39576 (WFMB file no. 712-2.382), filed 25 May 2012, as well as the family of corresponding application disclosed and referred to therein, for examples of different geometric bead shapes and configurations.

By way of further example, the functionalized polymer 12 may be formed in whole or in part on the surface 10a of the bead 10; and the scope of the invention is not intended to be limited to the amount of surface that is covered with the functionalized polymer, the thickness of the layer of the functionalized polymer, etc.

The scope of the invention is not intended to be limited to any particular mixture or ratio of insert materials (also known herein as non-functionalized proppants 22a) and functionalized polymer proppants 22a'. For example, embodiments are envisioned in which the proppant or proppant mixture includes substantially all functionalized polymer proppants 22a', as well as other mixtures or ratios of insert materials (i.e., non-functionalized proppants 22a) and functionalized polymer proppants 22a', e.g., depending on the particular application.

Figure 1B:
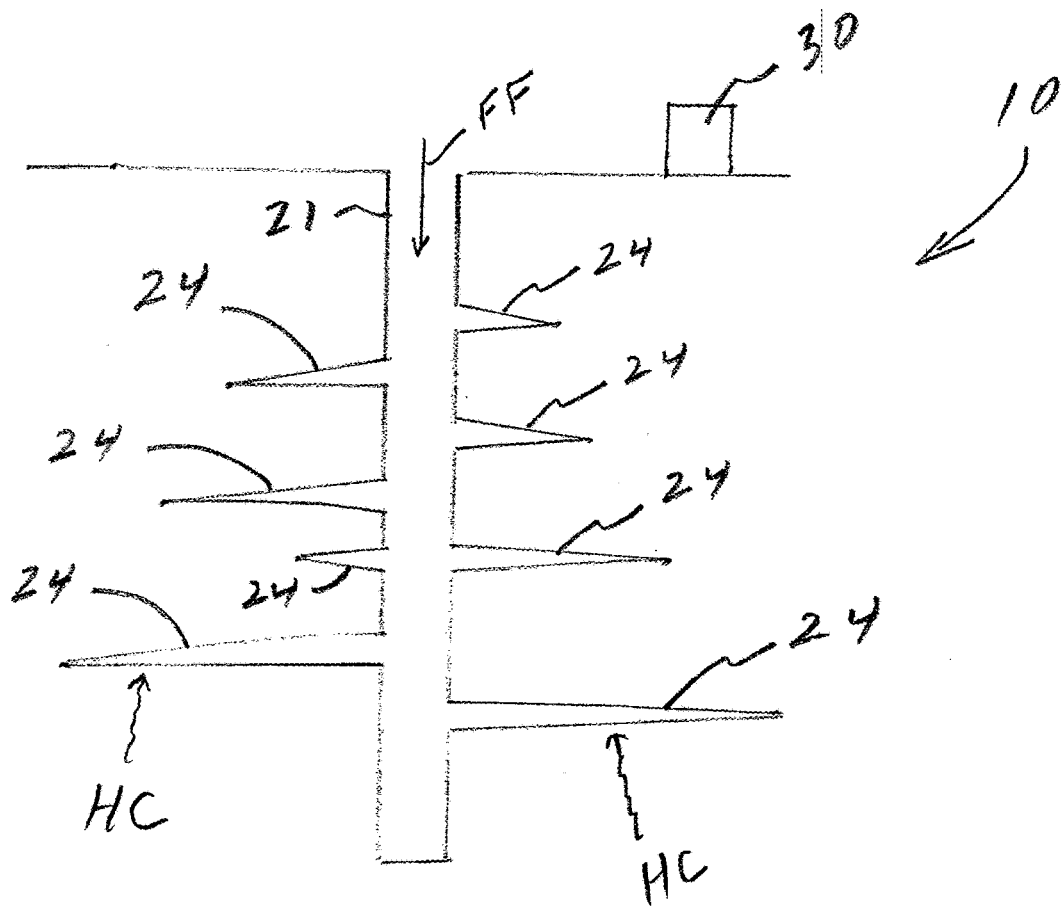
FIG. 1b shows a well having fissures that will receive at least some functionalized polymer proppant according to some embodiments of the present invention; and where

FIGS. 1b-1c

FIG. 1b shows apparatus in the form of a well generally indicated as 20 configured with a borehole 21 having fissures or pathways 24 created in a formation caused by well fracking and the application of a fracking fluid generally indicated by the reference label FF so as to allow a release of the hydrocarbon generally indicated as HC from the well 20.

FIG. 1c shows an example of one fissure or pathway 24 configured with the proppant or proppant mixture 22 having the insert materials 22a configured for providing the mechanical or physical function in the well 20 to hold open the fissure or pathway 24. Consistent with that set forth herein, the proppant or proppant mixture includes the functionalized polymer proppants 22a' that are configured to respond to the hydrocarbon or other composition of matter released from the well, including water, and provide the at least one chemical taggant 14 containing an indication about the hydrocarbon or the other composition of matter released from the well.

In FIGS. 1b and 1c, when the proppant or proppant mixture 22 is used in high pressure fracking fluids to fill the fissures like 24 created in the formation and hold open the paths ways for hydrocarbons, the proppant or proppant mixture 22 may also be configured with the functionalized polymer proppants 22a', consistent with that disclosed herein, and may also provide this mechanical function but as the hydrocarbons come into contact with the functionalized polymer proppants 22a', the functionalized polymer proppants 22a' may release the chemical taggant(s) 14 which is carried to the surface in the hydrocarbon fluids (well production fluids), consistent with that shown in FIG. 2. Detection of this chemical taggant(s) on the surface by sampling the production fluid, e.g., with a sampling device 30 (FIG. 1b), yields a measure of the efficiency of a given zone. Sampling devices like element 30, are known in the art, and the scope of the invention is not intended to be limited to any particular type or kind thereof either now known or later developed in the future.

FIGS. 2-3

By way of example, FIG. 2 shows functionalized polymer proppants 22a' coming in contact with, e.g., oil, and releasing the chemical taggant or chemical taggant compound 14, according to the present invention. As would be appreciated by a person skilled in the art, polymer formulations presently exist, are known in the art and well documented that allow the physical and chemical properties of a polymer substrate to be altered and controllable via an external influence. By way of example, the functionalized or functionizable polymer may take the form of a dual-monomer structure 40 that allows the tracer to be incorporated as a payload/core group, including where the dual-monomer structure like element 40 includes a core group 40a and end groups 40b, consistent with that shown in FIG. 3. This tracer may be then released via a desired external influence, e.g., which could be by contact with water, a certain pH, or one or more hydrocarbons. Furthermore, the scope of the invention is not intended to be limited to any particular type or kind of polymer structure either now known or later developed in the future; and embodiments are envisioned with the scope of the present invention using other types or kinds of polymer structures and or functionalized polymers in addition to that disclosed herein, e.g., including that shown in FIG. 3.

Fracking Fluids

Fracking fluids are known in the art. Depending on the particular application, known fracking fluids may contain water and be configured with different type of additives, e.g., including hydrochloric acid, (low pH can etch certain rocks, such as dissolving limestone, for instance), friction reducers, guar gum, biocides, emulsion breakers, and emulsifiers. By way of example, the reader is referred to U.S. Pat. Nos. 8,215,164; 8,273,320 and 8,568,573, which are hereby incorporated by reference in their entirety.

Applications

By way of example, the present invention may be used in, or form part of, or used in conjunction with, industrial or fracking processes involving drilling for hydrocarbons such as oil or natural gas.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A proppant mixture comprising:
    functionalized polymer proppants having mechanical structures configured to provide a mechanical or physical function in a well to hold open fissures or pathways created in formations caused by well fracking to allow a release of fluids from the well, wherein the fluids are hydrocarbons or water, each functionalized polymer proppant including an inner bead having an outer surface with a respective coating made of a functionalized polymer;
    the functionalized polymer proppants having a plurality of first functionalized polymer proppants with first functionalized polymer coatings configured to respond to a hydrocarbon released from the well, and provide a first functionalized polymer as a first chemical taggant or first chemical taggant compound containing an indication about the hydrocarbon released from the well; and
    the functionalized polymer proppants having a plurality of second functionalized polymer proppants with second functionalized polymer coatings configured to respond to at least a different fluid other than the hydrocarbon released from the well, including water, and provide a second functionalized polymer as a second chemical taggant or second chemical taggant compound containing a corresponding indication about the different fluid released from the well;
    the proppant mixture being configured to release a range of different tracer chemical compounds, the first chemical taggants, and/or the second chemical taggants so as to provide an ability to uniquely identify a given proppant in the well so as to allow the well to be fingerprinted or encoded by zone.

2. The proppant mixture according to claim 1, wherein the range of different tracer chemical compounds or taggants are configured to release a different chemical compound or taggant in the presence of water being produced from the formations so as to allow detrimental water producing zones to be identified in the well.

3. The proppant mixture according to claim 1, wherein the functionalized polymer comprises a dual-monomer structure.

4. The proppant mixture according to claim 3, wherein the different tracer chemical compounds or taggants include at least one tracer; and the dual-monomer structure is configured to allow the at least one tracer to be incorporated as a payload or core group.

5. The proppant mixture according to claim 4, wherein the tracer is configured to be released via an external influence.

6. The proppant mixture according to claim 5, wherein the external influence is when coming in contact with water, or the different fluid having a predetermined pH, or a predetermined hydrocarbon.

7. The proppant mixture according to claim 6, wherein the predetermined hydrocarbon is oil or natural gas.

8. The proppant mixture according to claim 3, wherein the dual-monomer structure comprises a core group and end groups.

9. The proppant mixture according to claim 1, wherein the functionalized polymer proppants comprise inner beads configured as solid materials either made from sand or ceramic materials coated with the functionalized polymer, or made from the functionalized polymer.

10. The proppant mixture according to claim 1, wherein the proppant mixture is configured to form part of a fracking fluid.

11. The proppant mixture according to claim 10, wherein the fracking fluid is gel-based, foam-based or slickwater-based.

12. The proppant mixture according to claim 1, wherein the proppant mixture comprises other non-functionalized proppants having corresponding mechanical structures configured to provide a corresponding mechanical or physical function in the well to hold the open fissures or pathways created in the formations caused by the well fracking to allow the release of the fluids from the well.

* * * * *